United States Patent [19]

Cué et al.

[11] Patent Number: 4,539,063

[45] Date of Patent: Sep. 3, 1985

[54] APPARATUS FOR THE TRANSFER OF PRINT DESIGNS

[75] Inventors: Robert Cué, Grosszimmern; Alfred Hagemann, Hochheim am Main, both of Fed. Rep. of Germany

[73] Assignee: Akerlund & Rausing Verpackung GmbH, Hochheim am Main, Fed. Rep. of Germany

[21] Appl. No.: 449,167

[22] Filed: Dec. 13, 1982

[30] Foreign Application Priority Data

Dec. 17, 1981 [DE] Fed. Rep. of Germany ....... 3149950
Nov. 10, 1982 [EP] European Pat. Off. ........ 82110357.9

[51] Int. Cl.[3] ........................ B32B 31/00; B44C 1/00; B65H 25/02

[52] U.S. Cl. .................................... 156/361; 156/542; 156/DIG. 33; 156/DIG. 37; 156/238; 226/45

[58] Field of Search ............... 156/362, 361, 241, 540, 156/541, 542, 367, 475, 358, 351, 495, 584, 238, DIG. 46, DIG. 33, DIG. 37; 74/21, 88; 226/32, 33, 45

[56] References Cited

U.S. PATENT DOCUMENTS

| | | | |
|---|---|---|---|
| 4,214,937 | 7/1980 | Geurtsen et al. | 156/361 |
| 4,264,394 | 4/1981 | Stewart | 156/542 |
| 4,313,779 | 2/1982 | Nix | 156/361 |
| 4,315,795 | 2/1982 | Jodrey et al. | 156/542 |
| 4,333,781 | 6/1982 | Meolenberg | 156/361 |
| 4,383,880 | 5/1983 | Geurtsen et al. | 156/361 |

*Primary Examiner*—Edward Kimlin
*Assistant Examiner*—Louis Falasco
*Attorney, Agent, or Firm*—Goodman & Teitelbaum

[57] ABSTRACT

The invention relates to a device for transferring a print design under action of heat from a carrier band (20) onto an object (24), in which the carrier band (20) is transported from a tape dispensing roll (1) past a scanning arrangement (5) and a preheating arrangement (6) by a drive roller (9) driven by a band drive motor (10) through a transfer zone to a band take-up reel (12). The object, in each case, to be provided with the print design is conveyed by a transport device (18) provided with holding members, a surface of the object receiving the print design as it passes into the transfer zone.

The particular print design is transferred under pressure and heat from the moved carrier band (20) onto the moving surface of the object (24). For the simplification of the construction and of the manner of operation of such a device, the band drive motor (10) for the drive roller (9) of the carrier band (20) is constructed as a step motor, where the synchronization of the band drive motor (10) with a transport drive motor (15) bringing about the movement of the surface of the object (24) is accomplished electrically by a pacer (16) allocated to the transport drive motor (15).

27 Claims, 6 Drawing Figures

APPARATUS FOR THE TRANSFER OF PRINT DESIGNS

The invention relates to an apparatus for transferring a print design under action of heat from a carrier tape onto an object formed, for example, as a hollow body, The carrier tape is transported from a tape dispensing roll past, for example, an optical, scanning arrangement and a preheating arrangement from a drive roller driven by a tape drive motor through a transfer zone to a tape receiving reel. The object to be provided, in each case, with the print design is conveyed from a transport arrangement provided with holding means, presenting, for example, a rotary plate, with its surface receiving the print design into the transfer zone, where the respective print design is transferred under pressure and heat from the moved carrier tape onto the moving surface of the object.

Such an apparatus is known, for example, from German unexamined patent specification OS No. 29 23 395. In this and all comparable transfer devices of hitherto, there is present a mechanical coupling between the movement of the transport band and the movement of the object to be provided with the design, in part with use of a spiked roller. Thus, there is required not only a considerable constructive expenditure, which contributes to a substantial increase in the expensive of the apparatus, but there is obtained an inseparable mechanical connection between the transport arrangement for the objects and the tape transport arrangement. Such transfer devices are slightly adaptable or awkwardly adaptable to the special conditions of a transfer process.

The object of the present invention is to simplify and make adaptable an apparatus of the above type according to this category in respect to constructive expenditure and manner of operation, as well as, in particular, to make possible also a simple separation of the transport arrangement for the object from the tape transport arrangement with the transfer station.

This object is achieved according to the invention substantially by the means that the band drive motor for the drive roller of the carrier band (tape), possibly equipped with pneumatically or hydraulically appliable contact pressure rollers, is constructed as a step motor, and that the synchronization of the band drive motor with a transport drive motor constructed, for example as a step motor, bringing about the movement of the surface of the object is accomplished electrically by a pacer allocated to the transport drive motor. Through the feature that there is provided an electrical coupling of the drive for the objects and of the drive for the carrier band over a pacer, with constructive simplification and exact maintenance of the velocities to be allocated to one another, there is possible an easy separation of the transport arrangement for the objects from the band transport arrangement with the transfer station, so that the transport arrangement for the objects is useable with the appertaining pacer not only in an apparatus built specially for the purpose for transferring print designs with heat treatment of the type according to this category, but also in machines on hand of other systems, for example for the screen-printing and hot-stamping process. This simplification is achieved by the electrical or electronic control of the transport of the carrier band and of the objects, with elimination of a mechanical control. By reason of the solution, found, there is given to the apparatus according to this category, a greater flexibility, and simultaneously, it is assured that the carrier band undergoes the necessary speed in relation to the movement of the surface of the object receiving the print design. The process to be executed with this apparatus can be carried out more economically, because the apparatus itself is more economical and can be operated economically. By reason of the control and attuning of the speeds on both hands over the pacer there can be achieved an exact speed of the surface of the object to be recorded in dependence on the design position for the generation of results of the highest quality.

The transport arrangement includes preferably a rotary or transport plate receiving the respective object, on which plate there engages a friction wheel of the pacer actuate the band drive motor, which friction wheel preferably has the same effective circumference as the drive roller. In this manner compulsorily through an equal turning rate of the friction wheel and of the drive roller, there is generated a synchronization between movement of the surface of the object and the carrier band, regardless of what circumference the round rotary plate has or what other form and movement, for instance, the linearly moved transport plate has.

According to a further development of the invention it, is provided that after the forward movement of the carrier band with the transfer of the print design onto the surface of the object, the carrier band is transported back, for example with the aid of the drive roller, until the scanning device arranged between the tape dispensing reel and the transfer zone, possibly along the path of movement of the carrier track, detects a control mark, formed possibly by a part of the print design itself on the transport band, for the setting of the transport band on the starting position for the next transfer operation and in which preferably the scanning arrangement includes a photoelectric cell responding selectively to a preselectable wavelength range, and the control mark of the carrier band emits in the preselectable wavelength range, for example, a fluorescent or phosphorescent dye.

Thus, therefore, each print design, regardless of its position relatively to the adjacent print designs of the carrier band, is brought each time into the new starting position, so that in the transfer process it occupies exactly the correct position in relation to the surface of the object to be printed. The reversal of the movement of the carrier band is possible by simple shifting over of the step motor to reverse. In the desired end position of the design, respectively of the control mark allocated to it, the scanning device gives off a signal to the step motor to switch this off. Through shifting of the scanning device along the path of movement of the transport band, there can be achieved an exact centering of the design image on the surface of the object to be decorated. In the case of a selective response capacity of a photoelectric cell, it is possible to identify the control mark and thereby to ensure that a carrier band is used with the desired designs.

According to a further development of the invention, between the tape dispensing reel and scanning device and/or between the drive roller and the band take-up reel, there is provided a band tensioning device tightening the carrier band (tape), in which preferably the first band tensioning device includes a dancer roll deflectable against the tension of a spring, and the deflecting movement of the dancer roll adjusts a potentiometer influencing the running speed of the tape dispensing reel, and/or in which preferably the second band tensioning arrangement includes a dancer roll defectable against the tension of a spring, and the deflecting movement of the carrier roll adjusts a potentiometer influencing the running speed of the tape (band) take-up reel. In this manner there is obtained a dependable automatic band tension over the entire path of movement of the carrier band, and, namely, both in forward and also in rearward movement of the carrier band.

Further, in the device of the invention, there can be allocated to the band (tape) dispensing reel a magnetic brake which is actuatable by a diameter control device allocated to the carrier band roll provided on the band dispensing reel or to the band tensioning device arranged between the band dispensing reel and scanning device, and/or the band take-up reel can be driven by a gear motor which is actuatable by a diameter control device allocated to the carrier band roll provided on the tape take-up reel or to the band tensioning device arranged between the drive roller and band take-up reel, and in which preferably the magnetic brake provides a magnetic field gap between a fixed armature part and a brake plate turnable with the tape dispensing reel, which is bridgeable by a magnetic field regulatable by the potentiometer. In this manner there is obtained, besides the automatic readjustment of the band tension, an automatic, uniform unwinding and winding of the carrier band, such as is required for the corresponding transfer process, in which the brake operates free of wear by reason of the special formation.

The requisite pressure and the requisite temperature in the transfer zone are maintained in the device of the invention in a simple manner in the transfer process by the means that, for example, a heatable contact pressure roll-presenting transfer device is pressable, for example, a pneumatically and/or hydraulically controllable contact pressure device in the transfer zone with the interposition of the carrier band in dependence on the movement path of the transport device against the surface of the object. The contact pressure roll serves there to give the separating medium, which holds the materials to be transferred of the design image, such as dyes, lacquers or the like, on the carrier band, the necessary temperature, so that the materials yielding the design image are transferred under the pressure to be applied from the carrier band onto the surface of the object. By reason of the control possibility of the contact pressure device, for example, by the transport device, it is possible to set the beginning and the end of the contact pressure zone in respect to the dimension of the design image. Thus, for example, there can be avoided transfer imprecisions at the beginning and at the end of the design image during the transfer process. The contact pressure device can be driven forward and back by an electrical command from the step motor of the drive roller.

Further, in further development of the invention, to the transport device there can be allocated a scanning device, for example optical or electrical, which preferably includes a cam plate moveable with the transport device, with an approach switch fixed with respect to this, but possibly adjustable, over which the transport of the carrier band and the bringing up of the transfer device is initiated and switched off.

Preferably the transport drive motor is controllable in dependence on the outer contour of the object. If, namely, the object has a surface curved, for example irregular in respect to its path of movement, then the individual points of the surface of the object move past the contact pressure device at a different relative speed. If, however, the transport speed is adapted to the contour of the object, distortions can be avoided in the transfer of the design image.

It is of special advantage, further, if the ratio of the transport speed of the object or of its surface to the transport speed of the correct carrier band is variable in correspondence to a further development of the invention. With this measure the design image can be expanded or compressed at will in the transfer from the carrier band to the surface of the object, in order to achieve special effects of presentation. Further, according to a further development of the invention it is expedient that the transport arrangement include at least one rotary plate borne in a carry-along plate, for the reception of a round element, which rotary plate is drivable to rotate in a first indexing position and a second transfer position in each case, with the rotary plate cooperating with the friction wheel in the transfer position. In the indexing position, the round, for example, bottle-shaped object, is brought into a prescribed position in respect to the transport device and its rotary plate, as, for example, an indexing pin of the the rotary plate engages into an indexing depression of the object. In this manner the bottle-shaped object always occupies a predetermined position in the transfer process. The transfer process itself is then completed by a simple turning of the rotary plate; which with the aid of the carry-along plate of the transport device, has been brought into the necessary position in the transfer zone of the apparatus. The synchronization between the turning of the rotary plate and the movement of the carrier band occurs in this case over the friction wheel, which engages on the rotary plate and picks up its rotation.

Further aims, features, advantages and application possibilities of the present invention are yielded from the following description of an example of execution with the aid of the appended drawing. There, all the features described and/or graphically represented by themselves or in any reasonable combination form the object of the present invention.

Figure 1:
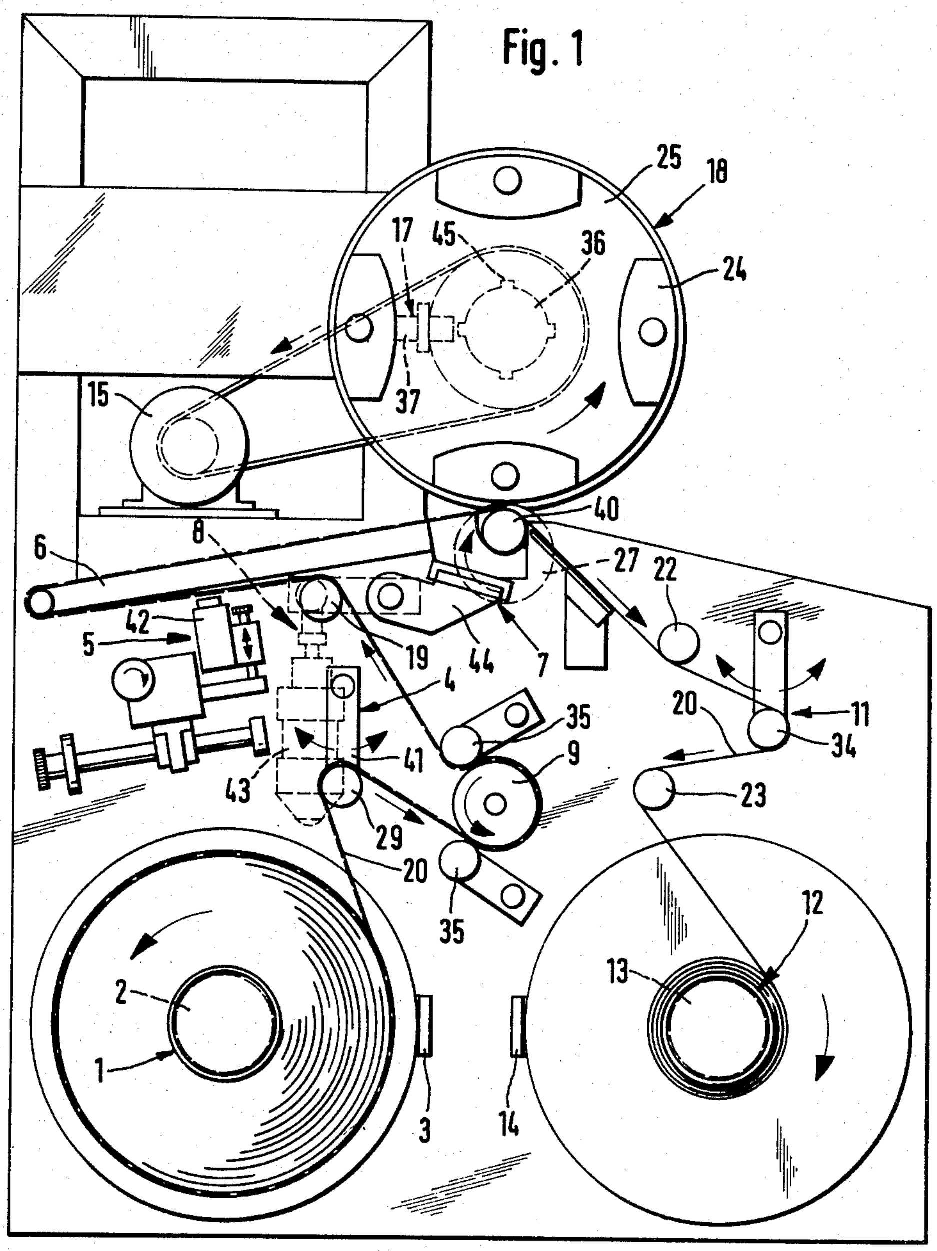
FIG. 1 shows in plan view a device for transferring print designs under action of heat according to one form of execution of the invention.

The form of execution represented in FIG. 1 is intended for the transfer of lable-form print designs from a carrier band 20 to bottle-shaped objects 24 of about oval shape. The rounding of the surface of the objects 24 to be printed corresponds about to the rounding of a rotary or transport plate 25, from which the objects 24 are taken up by a feed device (not shown) from reception positions off set by, for example, 90° to one another on the rotary or transport plate 25. The rotary or transport plate 25 is turnable by a transport drive motor 15, constructed for example as a step motor. The transport drive motor 15 and rotary or transport plate 25 form components of a transport arrangement 18 independent of the rest of the apparatus. The rotary or transport plate 25 is interchangeable for corresponding rotary or transport plates with other diameter when objects 24 of other surface curvature are to be printed.

Figure 2:
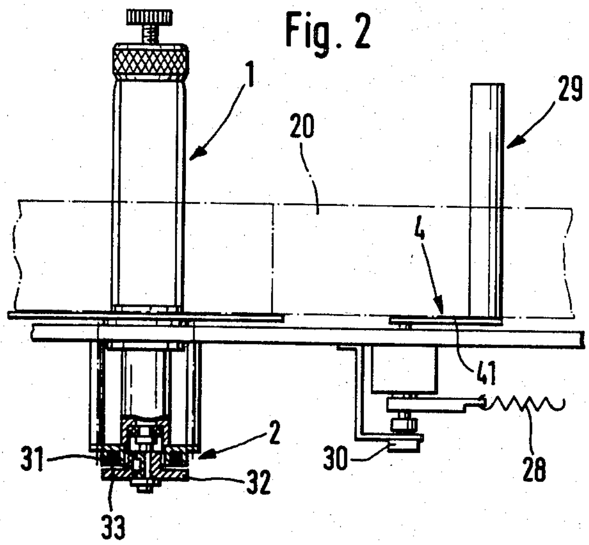
FIG. 2 shows schematically in side view the impulse-giver for the synchronization of the movement of the transport device and of the carrier band.
Figure 3:
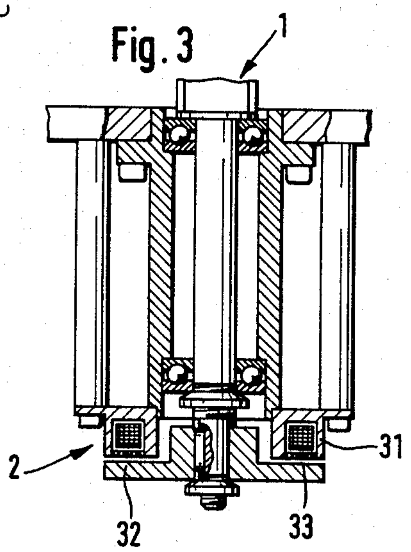
FIG. 3 shows schematically in side view the tape dispensing reel with magnetic brake and allocated band-tensioning arrangement.

The carrier band 20 is present at first in the form of a tape roll on a tape dispensing reel 1 and is clampable there and adjustable in height. To the tape dispensing reel 1 there is allocated a magnetic brake 2 (cf. in particular FIGS. 2 and 3) for the purpose of uniform band (tape) tension. This is achieved by the means that in the case represented, the carrier band 20, before it passes to a drive roller 9 with allocated contact-pressure rolls, is conducted over a band tensioning device 4 including a dancer roll 29. The dancer roll 29 is swingable against the action of a spring 28, as shown in FIG. 2. The swinging is transferred over an arm 41 to a potentiometer 30, which influences the magnetic field of the magnetic brake 2. The magnetic brake 2 has, as shown in FIGS. 2 and 3, a fixed armature part 31 including a magnetic field coil and a brake plate 32 turnable with the tape dispensing reel 1. Between armature part 31 and brake plate 32 there is present an adjustable magnetic field gap 33, the width of which, besides the coil current regulated by the potentiometer 30, is determinative for the braking action. The carrier band 20 passes from the drive roller 9 over a fixed roll 19 to a scanning device 5 and pass a preheating device 6 to the print design transfer zone, which is determined by a transfer arrangement 7. The scanning device 5 includes a photoelectric cell 42 which serves for the positioning of the label-form design image, and in each case, the next tranfer operation between the individual transfer operations. After the last transfer process, the carrier band 20 is, for example, briefly moved back by the drive roller 9 until the photoelectric cell detects a control mark on the carrier band, which is either self-sufficiently allocated to each next design image or is formed by a part of the particular design image itself. The photoelectric cell 42 can, for example, be formed in such a way that it only detects selectively determined wavelength ranges. The photoelectric cell 42 is adjustable in its spacing from the carrier band 20 in its height and also along the path of movement of the carrier band 20, so that there can be carried out a centering of the design image on the surface of the object 24 to be decorated. The preheating device 6 serves for the preheating of the separating medium with the aid of which the label-form print image formed of dyes, lacquers and the like is held on the carrier band 20, before this passes into the transfer zone. In the movement through the transfer zone itself, the side of the carrier band 20 carrying the label-form design images is pressed by a transfer device 7, which includes a heatable contact-pressure roll 40, onto the surface of the object 24, which is simultaneously moved past with the aid of the transport device 18, and, namely, with the aid of a mechanically, pneumatically or hydraulically operatable contact-pressure device 8. In the case represented the contact-pressure device 8 includes a pneumatic cylinder, which over a lever mechanism 44 presses the heatable contact-pressure roll 40 and thereby the carrier band 20 onto the surface of the object 24. The bring up and moving-off of the contact-pressure device 8 is accomplished on electric command of a scanning device 17 allocated to the transport arrangement 18. This scanning device 17 includes a cam plate 36 turnable with the rotary or transport plate 25 with cams 45 allocated to the reception positions of the objects 24 and an approach switch 37 fixed with respect to these. The drive of the contact-pressure device 8 can be accelerated and retarded, so that the actual pressing of the carrier band 20 onto the surface of the object 24 sets in already before the design image transfer and ceases only somewhat after this.

After the transfer arrangement 7, the now empty carrier band 20 runs over a fixed roll 22, a second band tensioning device 11 including a dancer roll 34, and another fixed roll 23 to a band (tape) take-up reel 12. The band take-up reel 12 is driven by a gear motor 13, the speed of which is regulated in a similar manner by the band tensioning arrangement 11, like the magnetic field of the magnetic brake 2. The deflection of the dancer roll 34 is transferred, namely, to a potentiometer in the feed current circuit of the gear motor 13.

Figure 4:
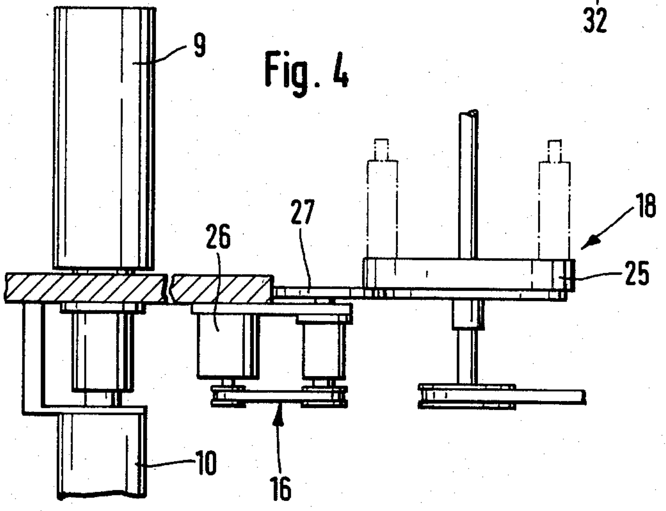
FIG. 4 shows with respect to FIG. 3, in section, the magnetic brake constructed according to the invention.

The drive roller 9 is driven by a band drive motor 10 constructed as a step motor (cf. in particular FIG. 4), in order to convey the carrier band 20, especially during the transfer process, through the transfer zone. The speed at which the band drive motor 10 operates is determined by a pacer 16. The pacer 16 includes a friction wheel 27 which picks up the circumferential speed of the rotary or transport plate 25. The friction wheel 27 has the same effective circumference as the drive roller intended for the transport of the carrier band 20. The revolution of the friction wheel 27 is transferred at a predetermined, but variable translation ratio to a pacer element 26 for the band drive motor 10 of the drive roller 9. The transport speed of the carrier band 20 through the transfer zone thereby agrees exactly with the surface velocity of the object to be decorated or differs slightly in the case of intended stretching or compression of the design image in the transfer process. The control or attuning of the relative velocity of the surface of the object 24 and the transport speed of the carrier band 20 is coordinated over an impulse-generator defined by the pacer 16, in which the agreeing circumference of friction wheel 27 and carrier roller 9 form the basic measure.

After completion of the transfer process of a label-form design image, the band drive motor 10 constructed as a step motor is switched over, whereby, with the aid of the drive roller 9, the carrier band 20 is briefly moved back, until the control mark on the carrier band 20 is detected by the scanning device 5. Then, again, the next design image has the correct starting position for the next transfer operation and the drive motor 10 is switched off by a signal from the scanning arrangement 5.

As is to be learned from the representation of FIG. 1, to both the band dispensing reel 1, and also the band (tape) take-up reel 12, there can be allocated diameter control devices 3 and 14, respectively. It is also possible to arrange the band drive motor 10 with the drive roller 9 in another place in the path of movement of the carrier band 20, if this appears advisable for reasons of functioning or of space.

Figure 5:
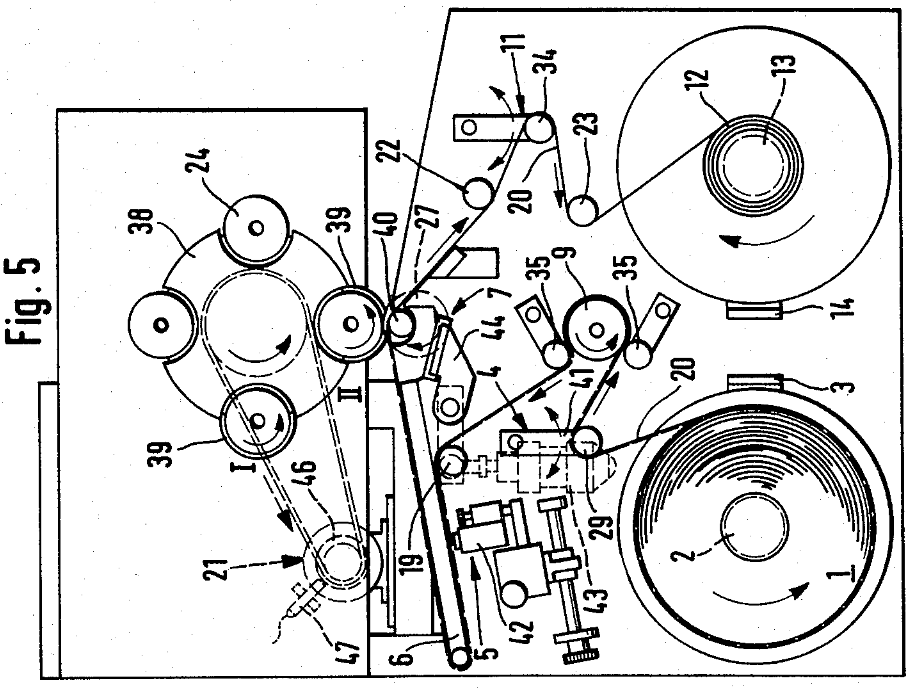

FIG. 5 illustrates in like plan view to FIG. 1, a device according to the invention which, however, is intended for the imprinting of round, bottle-shaped objects 24. For this purpose the transport arrangement 18 has one or two carry-along disks 38, on which there are turnably borne rotary plates 39 off set in each case, for example, by 90°. After the take-up of an object 24, the carry-along plate 38 is turned with the appropriate rotary plate 39 into an indexing station I, where through turning of the rotary plate 39 relatively to the object 24, the object is first brought into a predetermined position on the rotary plate 39, for example by cooperation of an indexing pin of the rotary plate 39 and of a corresponding indexing depression of the object 24. Then the carry-along plate 38 moves the rotary plate 39 with the indexed object 24 into the transfer station II, where the object 24 is rotated over the rotary plate for the transfer of the design image from the carrier band 20 onto the surface of the object. In this transfer operation, the friction wheel 27 again picks up the circumferential speed of the rotary plate 39, whereby over the pacer 16 and the drive roller 9, there is again establishable the transport speed of the carrier band 20 in agreement with the circumferencial speed of the object 24. In this case, there is allocated to the drive motor 21, of the carry-along plate 38, a cam plate 46 with an allocated approach switch 47. Over the cam plate 46, the bringing-up and moving-off signal is given to the contact-pressure device 8 of the transfer arrangement 7. The translation ratio between drive motor 21 and carry-along plate 38 amounts in the case represented to 4:1, so that in a full revolution of the cam plate 46 there takes place precisely ¼ of a revolution of the carry-along plate 38. The drive motor 21 is constructed for this purpose likewise preferably as a step motor. The remaining parts and functions of this example of execution of the transfer apparatus according to the invention agree with those of the apparatus represented in FIG. 1.

Figure 6:
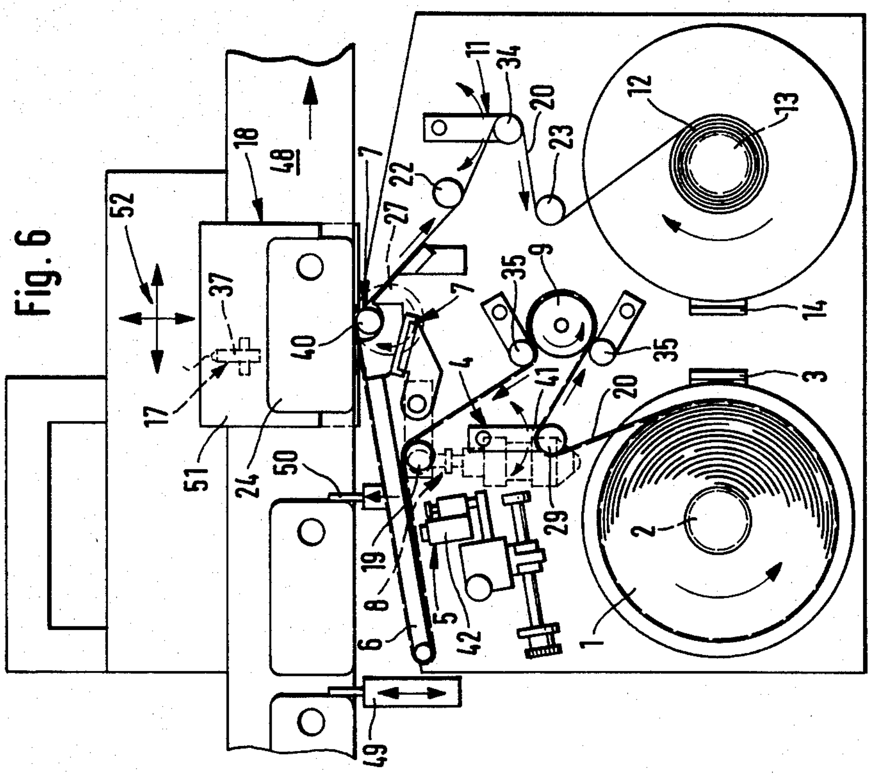
FIGS. 5 and 6 show in plan view schematically in each case a device for transferring print designs under action of heat according to further developments of the invention for round, bottle-shaped and rectangular, canister-form objects.

The transfer device, represented in FIG. 6 analogously similar to FIG. 1 in plan view, is intended for the imprinting of rectangular, for example canister-shaped objects 24. These objects 24 are fed into the transfer zone of the apparatus from left to right in the representation, on a conveyor band 48. At a distance in front of the transfer zone, there is provided on the conveyor band 48 a retractable and advanceable retaining stop 49, which on sliding in interrupts the further feed of objects 24 as soon as an object 24 is present on a likewise advanceable and retractable positioning stop 50 arranged nearer the transfer zone. The transport arrangement 18 includes a gripper 51, which can execute the movements represented at 52. It takes the object 24 off its positioning placement determined by the positioning stop 50, conveys it after the withdrawal of the positioning stop 50 at predetermined speed past the transfer zone of the apparatus and then delivers it again to the conveyor band 48. During the movement of the gripper 51 past the transfer zone of the apparatus, the linear velocity of the gripper with the object 24 is again picked up by a friction wheel 27 an analogous manner as in the previous examples of execution, and then transferred to the drive roller 9 for the carrier band 20. With the aid of an approach switch 37, here, too, the signal for the bringing up and moving off of the transfer device 7 is controlled by means of the contact-pressure device 8. The other parts and functions of the transfer device agree here, too, with those of the apparatus illustrated in FIG. 1.

List of reference numbers:

1—Band (tape) dispensing reel
2—Magnetic brake
3—Diameter control device
4—Band tensioning arrangement
5—Scanning device
6—Preheating arrangement
7—Transfer arrangement
8—Contact-pressure device
9—Drive roller
10—Band drive motor
11—Band tensioning arrangement
12—Band take-up reel
13—Gear motor
14—Diameter control device
15—Transport drive motor
16—Pacer
17—Scanning device
18—Transport arrangement
19—Roll
20—Carrier band
21—Drive motor
22—Roll
23—Roll
24—Object
25—Rotary or transport plate
26—Step-giver (pacer) element
27—Friction wheel
28—Spring
29—Dancer roll
30—Potentiometer
31—Armature part
32—Brake plate
33—Magnetic field gap
34—Dancer roll
35—Contact-pressure rollers
36—Cam plate
37—Approach switch
38—Carry-along plate
39—Rotary plate
40—Contact-pressure roll
41—Arm
42—Photoelectric cell
43—Pneumatic cylinder
44—Lever mechanism
45—Cam
46—Cam plate
47—Approach switch
48—Conveyor band
49—Retaining stop
50—Positioning stop
51—Gripper
52—Movements

What is claimed:

1. In a device for transferring a print design under heat action from a carrier band onto an object, wherein the carrier band is transported from a tape dispensing roll past a scanning device and a preheating device by a drive roller driven by a band drive motor, and then through a transfer zone to a band take-up roll, and wherein in each case the object to be provided with a print design is conveyed by a transport arrangement provided with holding means so that a surface of the object for receiving the print design passes into the transfer zone, where the print design in each case is transferred under pressure and heat from the moved carrier band onto the moving surface of the object, an improvement comprising:

said band drive motor for said drive roller of said carrier band being constructed as a step motor;

a transport drive motor for bringing about movement of the surface of the object;

electrical means for synchronization of said band drive motor with said transport drive motor;

said electrical means including a pacer allocated to said transport drive motor;

first means for conveying said carrier band backwards from said transfer zone after a particular print design is transferred onto the surface of the object during forward movement of the carrier band;

a scanning arrangement including said scanning device being arranged between said tape dispensing roll and said transfer zone; and said scanning arrangement including second means for detecting a control mark provided on said carrier band for stopping said first means from conveying said carrier band backwards so that said carrier band is set on a starting position for its next transfer operation.

2. A device according to claim 1, wherein the transport arrangement includes a transport plate for receiving the object in each case, said pacer including a friction wheel for engaging said transport plate, said friction wheel actuates a pacer element associated with said band drive motor for the synchronization thereof.

3. A device according to claim 2, wherein said transport plate is a rotary plate.

4. A device according to claim 2, wherein said friction wheel has a circumference effectively equal to a circumference of said drive roller.

5. A device according to claim 1, wherein said drive roller is provided with pneumatically applicable contact pressure rollers.

6. A device according to claim 1, wherein said drive roller is provided with hydraulically applicable contact pressure rollers.

7. A device according to claim 1, wherein said transport drive motor is constructed as a step motor.

8. A device according to claim 1, wherein said first means includes said drive roller for conveying said carrier band backwards.

9. A device according to claim 1, wherein said second means for detecting the control mark is adjustable along a path of movement of said carrier band.

10. A device according to claim 1, wherein said control mark is a part of the print design itself.

11. A device according to claim 1, wherein said second means of said scanning arrangement includes a photoelectric cell responding selectively to a preselected wavelength range, said control mark emitting in said preselected wavelength range.

12. A device according to claim 11, wherein said control mark is a fluorescent dye.

13. A device according to claim 11, wherein said control mark is a phosphorescent dye.

14. A device according to claim 1, wherein at least one band tensioning means is provided for tensioning said carrier band.

15. A device according to claim 14, wherein said band tensioning means includes a dancer roll deflectable against a spring tension so that deflecting movement of said dancer roll adjusts a potentiometer, said potentiometer influencing running speed of the tape dispensing roll.

16. A device according to claim 14, wherein said band tensioning means includes a dancer roll deflectable against a spring tension so that deflecting movement of said dancer roll adjusts a potentiometer, said potentiometer influencing running speed of the band take-up roll.

17. A device according to claim 14, wherein the tape dispensing roll is provided with a magnetic brake which is actuatable by said band tensioning means.

18. A device according to claim 17, wherein said magnetic brake provides a magnetic field gap disposed between a fixed armature part and a brake plate turnable with the tape dispensing roll, said magnetic field gap being bridgeable by a magnetic field regulatable by a potentiometer.

19. A device according to claim 14, wherein the band take-up roll is provided with a magnetic brake which is actuatable by said band tensioning means.

20. A device according to claim 1, wherein the tape dispensing roll is provided with a magnetic brake which is actuatable by a diameter control device provided on the tape dispensing roll.

21. A device according to claim 1, wherein the band take-up roll is driven by a gear motor, said gear motor being driven by a diameter control arrangement provided on the band take-up roll.

22. A device according to claim 1, wherein a transfer device coacts with a controllable contact-pressure device in said transfer zone for pressing said carrier band against the surface of the object in dependence upon movement of the transport arrangement, said controllable contact-pressure device including a heatable contact-pressure roll.

23. A device according to claim 1, wherein the transport arrangement is provided with a second scanning arrangement, said second scanning arrangement including a cam plate movable with the transport arrangement, and an approach switch coacting with said cam plate so that the transport of said carrier band and bringing up of a transfer device is initiated and switched off by said second scanning arrangement.

24. A device according to claim 23, including means for adjusting said approach switch.

25. A device according to claim 1, including means for controlling said transport drive motor in dependence upon an outer contour of the object.

26. A device according to claim 1, including means for varying ratio of transport speed of the surface of the object to transport speed of said carrier band.

27. A device according to claim 1, wherein the transport arrangement includes at least one rotary plate provided in a carry-along plate for reception of a round object, means for driving said rotary plate in each case in rotation from a first indexing position to a second transfer position, said rotary plate cooperating with a friction wheel of said pacer in said second transfer position.

* * * * *